United States Patent
Bumgarner et al.

(10) Patent No.: US 10,624,497 B1
(45) Date of Patent: Apr. 21, 2020

(54) TOASTER

(71) Applicants: Stacie Bumgarner, Arlington, TX (US); Barbara Bumgarner, Arlington, TX (US)

(72) Inventors: Stacie Bumgarner, Arlington, TX (US); Barbara Bumgarner, Arlington, TX (US)

( * ) Notice: Subject to any disclaimer, the term of this patent is extended or adjusted under 35 U.S.C. 154(b) by 1110 days.

(21) Appl. No.: 14/308,073

(22) Filed: Jun. 18, 2014

Related U.S. Application Data

(60) Provisional application No. 61/836,345, filed on Jun. 18, 2013.

(51) Int. Cl.
*A47J 37/08* (2006.01)
*A47J 37/06* (2006.01)

(52) U.S. Cl.
CPC .............. *A47J 37/08* (2013.01); *A47J 37/06* (2013.01)

(58) Field of Classification Search
CPC . A47J 37/0623; A47J 37/0871; A47J 37/0629
USPC ......... 99/337, 339, 340, 385, 389, 390, 391; 219/412, 413, 414, 518
See application file for complete search history.

(56) References Cited

U.S. PATENT DOCUMENTS

| | | | | |
|---|---|---|---|---|
| 2,907,269 A | * | 10/1959 | Rodwick | A47J 37/0814 99/329 R |
| 4,889,042 A | * | 12/1989 | Hantz | A47J 37/0623 99/337 |
| 5,006,690 A | * | 4/1991 | Cole | A47J 37/08 219/385 |

FOREIGN PATENT DOCUMENTS

| | | | | |
|---|---|---|---|---|
| GB | 1488907 A | * | 10/1977 | A47J 37/06 |
| GB | 2523365 A | * | 8/2015 | A47J 37/0676 |

* cited by examiner

*Primary Examiner* — Thien S Tran
(74) *Attorney, Agent, or Firm* — Kenneth L Tolar

(57) ABSTRACT

A toaster includes a housing having a front wall, a rear wall, a bottom wall, a top wall and two opposing sidewalls. On the top wall are a plurality of bread-dispensing openings, each in communication with a designated cooking chamber. Vertically positioned within each cooking chamber is a heating element and a deployable grill. A lift mechanism includes a plurality of rotatable catch members that release the grill whenever the housing is upright so that the device functions as a conventional toaster. However, when the housing is rotated to lie on its rear wall, the catch members automatically grip the grill so that the lift mechanism ejects it through the bread-dispensing opening.

8 Claims, 2 Drawing Sheets

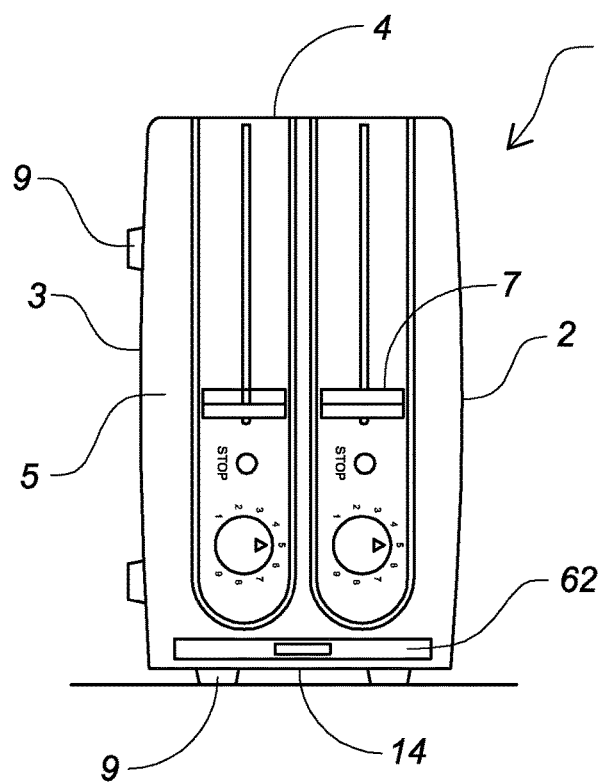
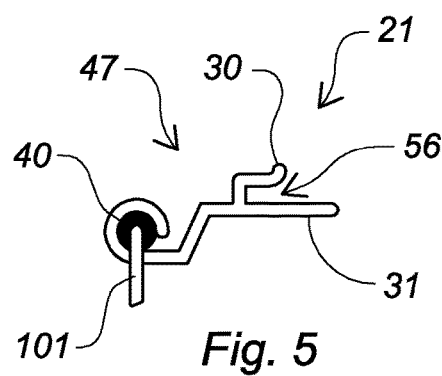
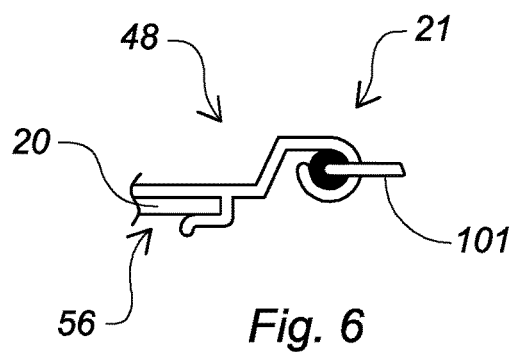
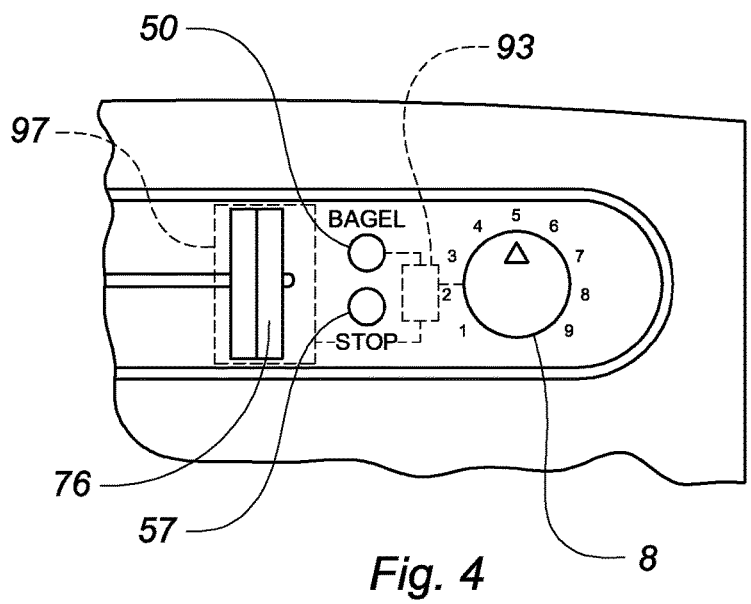

TOASTER

CROSS REFERENCE TO RELATED APPLICATIONS

This application is entitled to the benefit of provisional patent application No. 61/836,345 filed on Jun. 18, 2013, the specification of which is incorporated herein by reference.

BACKGROUND OF THE INVENTION

The present invention relates to a toaster that allows a user to either toast bread slices or grill sandwiches.

DESCRIPTION OF THE PRIOR ART

Grilling sandwiches in a skillet or pan is burdensome, laborious and messy. If a sandwich will fit within a bread toaster, the contents typically melt, drip to the bottom and burn. Cleaning burnt and melted food from a toaster interior is extremely difficult and time consuming. A conventional oven or a toaster oven does not heat a sandwich uniformly, resulting in burnt bread and cold contents. Accordingly, there is currently a need for a device that allows a user to more easily grill a sandwich. The present invention addresses this need by providing a toaster that is automatically converted to a sandwich grill when placed on its rear.

SUMMARY OF THE INVENTION

The present invention relates to a toaster comprising a housing having a front wall, a rear wall, a bottom wall, a top wall and two opposing sidewalls. On the top wall are a plurality of bread-dispensing openings, each in communication with a designated cooking chamber. Vertically positioned within each cooking chamber are a pair of spaced heating elements and a spring-biased grill. Slidably mounted on one of the sidewalls is at least one lever that moves a spring-biased lift mechanism to raise and lower a slice of bread within the cooking chamber. The lift mechanism includes a plurality of rotatable catch members that form a horizontal support surface on which the bread slice rests when the housing is upright. However, when the housing is placed onto its rear wall, the catch members rotate to grip the grill so that the lift mechanism also ejects the grill through the bread-dispensing opening. Accordingly, a user can toast bread when the housing is upright or grill sandwiches when the housing is lying on its rear wall.

It is therefore an object of the present invention to provide a toaster that also easily grills sandwiches.

It is another object of the present invention to provide a toaster that is automatically converted to a sandwich grill when rotated onto its rear wall.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is a side view of the toaster uprightly oriented to toast bread.

FIG. 4 is an isolated view of the timer-control knob.

FIG. 5 is an isolated, end view of the lift mechanism, showing the catch-member orientation when the housing is upright for toaster operation.

FIG. 6 is an isolated, end view of the lift mechanism, showing the catch-member orientation when the housing is horizontal for grilling operation.

DESCRIPTION OF THE PREFERRED EMBODIMENT

Figure 1:
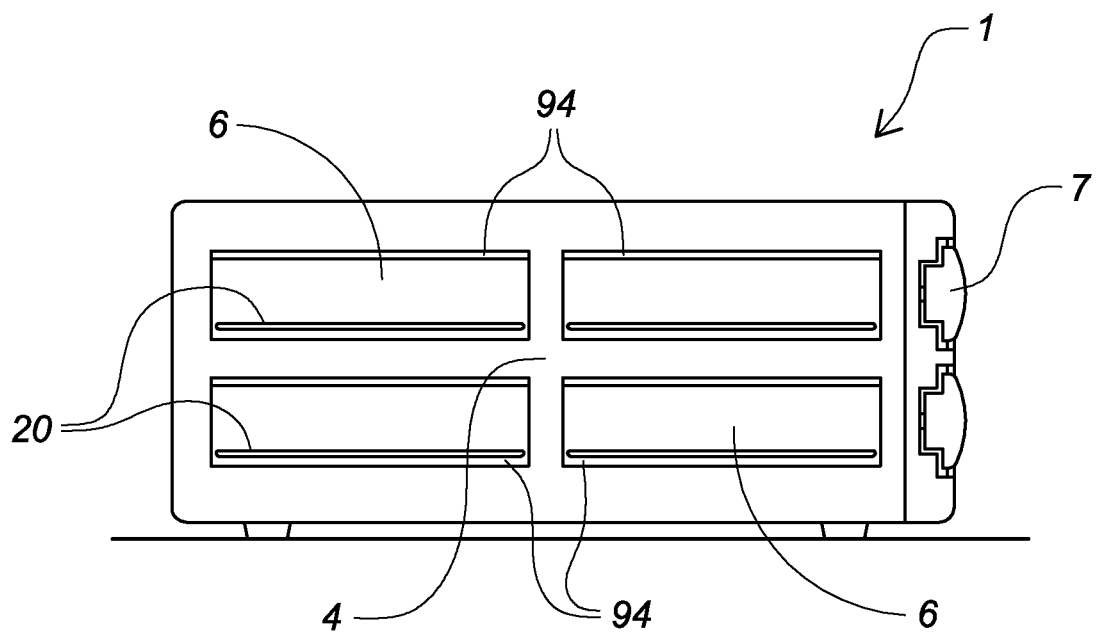
FIG. 1 depicts the toaster according to the present invention lying on its rear wall in a grilling position.
Figure 2:
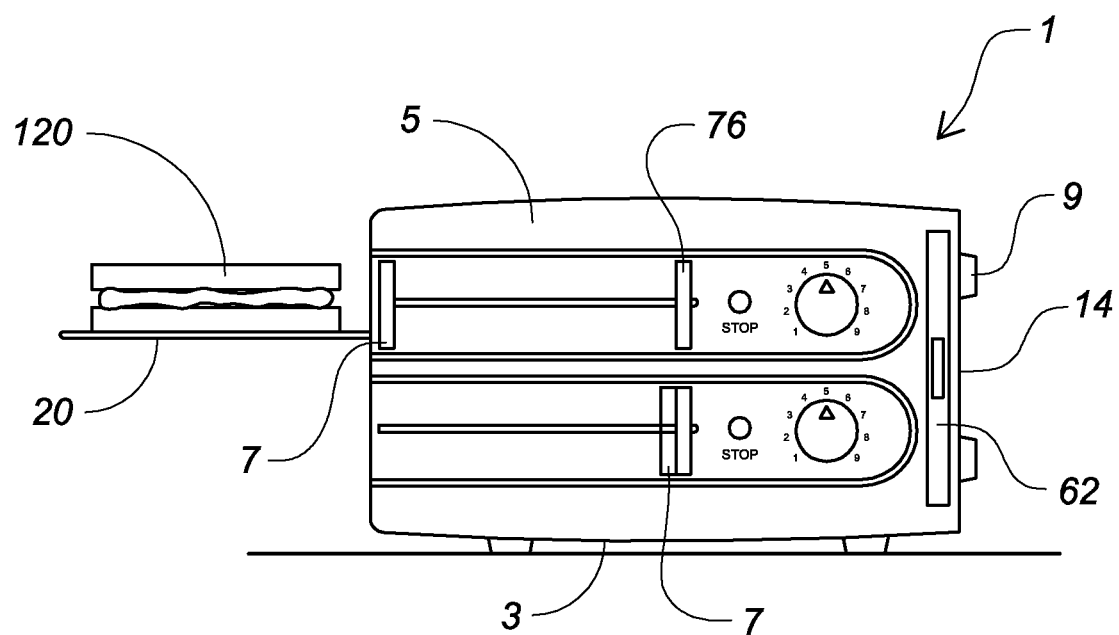
FIG. 2 is a side view of the toaster of FIG. 1 with the grill ejected from the housing.

The present invention relates to a toaster comprising a housing 1 having a front wall 2, a rear wall 3, a bottom wall 14, a top wall 4 and two opposing sidewalls 5. On the top wall are a plurality of bread-dispensing openings 6, each in communication with a designated cooking chamber. Slidably mounted on one of the sidewalls is one or more slidable levers 7 that each move a uniquely designed, spring-biased lift mechanism to raise and lower a slice of bread within the cooking chamber. As such, the housing includes releasable latch members 97, such as electromagnets or similar mechanisms, for restraining the lift mechanism when the levers are depressed to a lowermost, "start" position as depicted in FIGS. 3 and 4. Vertically positioned within each cooking chamber are pair of opposing Nichrome heating elements 94 and a deployable, spring-biased grill 20. An electric circuit 93 activates the heating elements and the latch members 97 for a predetermined duration when the levers are moved to the "start" position.

The lift mechanism includes a plurality of catch members 21 rotatably mounted on an elongated, spring-biased shaft 40 received within the cooking chamber. An end of the shaft 40 is attached to a lever 7 so that the lift mechanism and associated lever 7 move in unison. Each catch member includes a flared, shorter gripping finger 30 and a longer, planar platform 31 with a gap 56 formed therebetween. When the housing is vertically oriented for toaster operation, each catch member rotates to a first, horizontal position 47 wherein the platform 31 is beneath the gripping finger 30 as depicted in FIG. 5. In such position, the platform provides a horizontal surface on which the lower edge of a bread slice rests. When the housing is rotated to lie on its rear wall, each catch member automatically rotates 180-degrees (the catch member rotates 90 degrees relative to the housing and the housing is rotated another 90 degrees) to an inverted position 48, as depicted in FIG. 6. In the inverted position, the finger is positioned beneath the platform and the gap 56 is aligned with the lower edge of the grill.

The grill is biased in a retracted position such that sliding the lever toward the bread-dispensing openings causes the catch members to quickly and firmly grip the lower edge of the grill. Once the grill has been ejected through an opening 6, a user can place a sandwich 120 or other desired food item thereon. As the levers are slid to the start position, the spring-biased grill remains firmly lodged within the catch-member gap until the levers are locked by the releasable latch members. Stop pins 101 limit rotation of the catch members within a 90-degree range.

A timer knob 8 on one of the housing sidewalls sets a predetermined time period that the releasable latch members and heating elements will be engaged once the levers are moved to the start position. Upon the expiration of the predetermined time period, the latch members are disengaged, causing the spring-biased lift mechanism to propel a bread slice upwardly or the grill horizontally depending upon the housing orientation. Both the bottom and rear walls of the housing include feet 9 for elevating and stabilizing the housing on an underlying surface in either the upright or supine position. Furthermore, the toaster could have a one-side toasting control switch 50 that is energized whenever the housing is upright to toast buns, bagels and similar items. The control switch is automatically disabled when the housing is horizontally oriented. A toasting interval may also be manually terminated with a stop switch 57. A removable crumb tray 62 allows a user to easily discard accumulated food residue.

A normally stationary, supplemental lever 76 is positioned beneath the slidable lever to allow a user to override the timed latch mechanism and eject a bread slice or the grill. Furthermore, the supplemental lever can be used to eject a jammed food item that is too thick or heavy for the biasing springs to eject.

Accordingly, a user can toast bread when the housing is upright or grill sandwiches when the housing is lying on its rear wall. In either mode, once a preselected cooking duration has expired, the lift mechanism automatically projects the bread or sandwich through the bread-dispensing opening.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A toaster comprising:
    a housing having a front wall, a rear wall, a bottom wall, a top wall and two opposing sidewalls;
    at least one bread-dispensing opening on the top wall, said bread-dispensing opening in communication with a cooking chamber;
    a heating means on each of two opposing sides of said cooking chamber for simultaneously heating two opposing sides of a food item;
    a spring-biased grill received within said cooking chamber;
    a lift mechanism within said cooking chamber for raising and lowering a food item within said cooking chamber;
    means for releasably connecting said lift mechanism to said grill when said housing is placed on the rear wall to convert said toaster to a sandwich grill, wherein said means for releasably connecting said lift mechanism to said grill when said housing is placed on the rear wall to convert said toaster to a sandwich grill comprises:
    a plurality of catch members rotatably mounted on a spring-biased shaft received within the cooking chamber, each of said catch members including a gap formed thereon whereby when said housing is vertically oriented for toaster operation, each of said catch members rotates to a first, horizontal position to release said grill and to provide a horizontal surface on which a lower edge of a bread slice rests, and when said housing is lying on the rear wall, each of said catch members automatically rotates to an inverted position wherein said grill is received within said gap.

2. The toaster according to claim 1 wherein an end of said shaft is connected to a primary lever that is slidably mounted on one of said sidewalls.

3. The toaster according to claim 1 wherein said grill is biased in a retracted position to assure that said grill remains within said gap.

4. The toaster according to claim 1 wherein each of said catch members includes a pair of stop pins that limit a range of rotation.

5. The toaster according to claim 2 further comprising a releasable latch member for restraining the lift mechanism when the primary lever is depressed to a lowermost position.

6. The toaster according to claim 5 further comprising a timer means for setting a predetermined time period that the releasable latch member and heating elements are engaged once said primary lever is moved to the lowermost position, whereupon expiration of the predetermined time period, the latch members are disengaged, causing the lift mechanism to propel a bread slice upwardly or the grill horizontally depending upon an orientation of said housing.

7. The toaster according to claim 1 further comprising feet on said bottom wall and said rear wall for elevating and stabilizing the housing on an underlying surface in either an upright or supine position.

8. The toaster according to claim 5 further comprising a second, supplemental lever positioned beneath the primary lever to allow a user to override the timer means and manually eject a bread slice or the grill depending upon an orientation of said housing.

* * * * *